April 9, 1968     F. R. EMMONS     3,376,802
TRACKING LOOP FOR AIRCRAFT CABIN PRESSURE REGULATING SYSTEM
Filed July 8, 1966
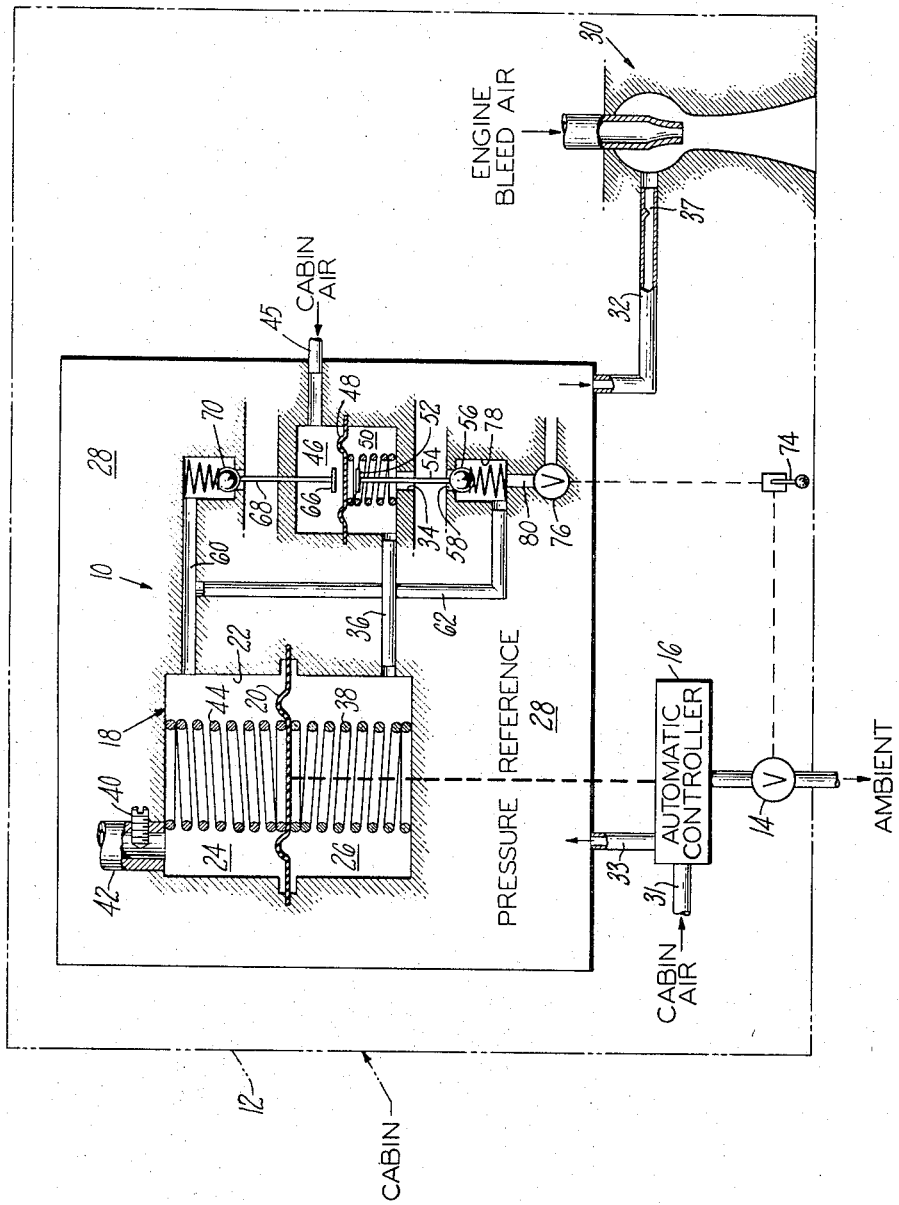
INVENTOR.
FLOYD R. EMMONS
BY *Norman Friedland*
ATTORNEY United States Patent Office 3,376,802
Patented Apr. 9, 1968

3,376,802
TRACKING LOOP FOR AIRCRAFT CABIN
PRESSURE REGULATING SYSTEM
Floyd R. Emmons, Granby, Conn., assignor to United
Aircraft Corporation, East Hartford, Conn., a corporation of Delaware
Filed July 8, 1966, Ser. No. 563,727
7 Claims. (Cl. 98—1.5)

This invention relates to aircraft cabin pressure regulators and more particularly to a tracking system which serves to maintain the rate controller of the cabin pressure regulator in a standby or ready position during certain operating regimes.

In heretofore known cabin pressure controllers various sensing elements, as for example the rate control, are designed to operate against a reference pressure which is created by communicating the reference pressure chamber with both ambient air surrounding the cabin and cabin air. In such systems, however, the reference pressure which normally is closely related to the cabin air pressure may deviate considerably and change rapidly. As for example, in the situation where the supercharger is not producing to its capacity the pressure in the cabin becomes extremely low or drops rapidly, then the reference pressure may deviate from the normal relationship from the cabin pressure. Or, in another example, where the cabin pressure regulator has both an automatic and manual operable pressure regulating system and the systems are switched from an automatic to a manual condition or vice versa, the cabin pressure may change rapidly and hence, the reference pressure may be forced to change rapidly. When there is a rapid change in the values, that is, cabin pressure and reference pressure, the rate controller which normally controls the reference pressure at some predetermined rate, would attempt to prevent the reference pressure to change at a higher rate which may be necessary to overcome the difficulty that was encountered. When control is restored to the automatic system, the rate control, by attempting to hold back the forced rapid change, will be saturated in a direction against the rapid change, hence commanding a rapid and uncomfortable change in cabin pressure in the opposite direction.

I have found that I can obviate this problem by providing means for having the reference pressure track the cabin pressure so that a large deviation will not cause this rapid reversal and change of pressure. Whenever an abnormal condition ensues, in accordance with my invention, the rate control automatically becomes disabled. In addition, it tracks the reference, hence cabin pressure so that when the rate controller is put back into operation, the value of the reference pressure will be close to the value of the cabin pressure and no rapid changes will be commanded to reference pressure.

Other features and advantages will be apparent from the specification and claims and from the accompanying drawings which illustrate an embodiment of the invention.

The single figure is a schematic illustration showing the invention in its preferred embodiment wherein the cabin pressure regulator generally illustrated by numeral 10 is suitably mounted in an aircraft cabin which is illustrated schematically by the dash outline indicated by numeral 12. Cabin pressure is regulated by opening and closing the valve schematically illustrated by numeral 14 which is shown to be operated by an automatic pressure controller generally indicated by reference numeral 16. For the sake of convenience and simplicity of the description, a detailed description of the automatic cabin pressure controller is omitted but suitable regulator is illustrated in Patent Nos. 2,610,564; 2,620,719 and 2,672,085, and reference is hereby made thereto. The purpose of the automatic controller is to maintain the cabin pressure at a predetermined level wherein an isobaric control maintains the cabin pressure at a given absolute value and a $\Delta P$ control serves to assure that the difference between the cabin pressure and ambient pressure never exceeds a predetermined value so that forces will not cause structural damage to the cabin. The rate of change controller is well known as a device that serves to assure that the rate of cabin pressure change does not exceed a predetermined value which otherwise would cause uncomfort or injury to the occupants. As is shown in the figure, the rate controller comprises a suitable sensor 18 which includes diaphragm 20 serving to divide cavity 22 into two separate subchambers 24 and 26. Reference pressure established within controller cavity 28 is obtained by modulating the flow of air from the cabin to the ejector 30 via lines 31, 32 and 33 and orifice 37. The ejector may be driven by engine bleed air but it is to be understood that the ejector is only necessary during ground operations since during flight the controller communicates with ambient anyway. The reference pressure will normally be at some value below that of cabin pressure, say 10 inches of water.

The operation of the rate of change controller is as follows. Reference pressure enters opening 34 and is admitted into chamber 26 through line 36. This pressure acts on the underside of diaphragm 20 and it, together with spring 38, serves to bias diaphragm 20 in an upward direction. Reference pressure is admitted into chamber 24 to act on the other sire of diaphragm 20 via restriction 40 disposed in pipe 42. The restriction creates a pressure drop of the fluid being admitted into chamber 24. Obviously during steady state, the pressure in chamber 24 together with spring 44 creates a force on diaphragm 20 equal and opposite to the force created by pressure in chamber 26 and spring 38. When a change in reference pressure is evidenced, flow through restrictor 40 will create a pressure drop and the pressure differential between the pressure in chamber 24 and chamber 26 creates a force differential across diaphragm 20 urging the diaphragm to translate. This in turn actuates the automatic controller 16 which then, in turn, adjusts valve 14.

From the foregoing it is apparent that whenever the rate of change exceeds a predetermined value, diaphragm 20 will shift to prevent the rate of change from exceeding that particular value. The value of the rate of change is determined by the size of restrictor 40. A given setting will establish a predetermined rate.

What has been described above is well known in the art and the improvement to the rate of change controller is described hereinbelow.

Thus according to this invention it is necessary for the rate controller to be inactivated when the difference between the reference pressure and cabin pressure exceeds a predetermined value thus indicating that the normal relationship has been disturbed. This is accomplished by sensing cabin air via line 45 and admitting it into chamber 46 to act on the upper surface of diaphragm 48 and to apply reference pressure into chamber 50, noting that the diaphragm then senses the difference between reference and cabin pressure. When cabin pressure exceeds the predetermined value above reference pressure, diaphragm 48 will be caused to move in a downward direction bearing against platen 52 which is secured to stem 54 as schematically illustrated and in turn urges ball valve 56 away from opening 58. This, in turn, communicates chamber 24 with chamber 28 via lines 60 and 62. Since chamber 24 communicates with the pressure in chamber 28 and chamber 26 communicates also with pressure in chamber 28 the pressures being equal will not produce a rate control signal to the automatic control and hence the rate sensor will become inoperative.

Likewise, if the cabin pressure drops below a predetermined value below reference pressure, diaphragm 48 will move in the upward direction urging a force against platen 66 which carries valve stem 68 secured to ball valve 70 for unseating the ball valve and communicating chamber 24 with the pressure in chamber 28 via line 60. Likewise, this deactivates the rate sensor.

It will be noted that platens 66 and 52 are spaced from the diaphragm in order to provide a dead band, the value of which is determined by the distance therebetween.

The rate sensor may be inactivated in other ways in accordance with this invention, as for example where it is desirable to manually control the pressure in the cabin by manually moving pressure regulating valve 14. Schematically illustrated pivotable lever 74 will position valve 14 for opening and closing the valve thereof for controlling the pressure in the cabin at will. When this lever is moved from its position, it actuates valve 76 which bleeds fluid from chamber 24 via lines 60, 62, chamber 78 and line 80. Hence as in the above, the rate sensor becomes deactivated.

It should be understood that the invention is not limited to the particular embodiments shown and described herein, but that various changes and modifications may be made without departing from the spirit or scope of this novel concept as defined by the following claims.

I claim:
1. For a cabin pressure regulator including:
   pressure control means which is normally operable against a reference pressure,
   an outflow valve for adjusting the pressure in said cabin being responsive to said control means,
   tracking means for tracking the actual pressure in the cabin,
   said tracking means including means for adjusting said outflow valve independently of said reference pressure when said cabin pressure deviates from reference pressure by a predetermined value.

2. For a regulator as claimed in claim 1 wherein said control means includes means for limiting the rate of change of flow ingressing to or egressing from the cabin.

3. For a regulator as claimed in claim 1 wherein said tracking means includes means for establishing a dead band for establishing the points at which said tracking means becomes operable in accordance with the deviation between said reference and cabin pressure values.

4. For a regulator as claimed in claim 1 wherein said tracking means includes a pressure responsive device being movable as a function of the difference between actual cabin pressure and reference pressure.

5. For a regulator as claimed in claim 2 wherein said rate of change limiting means includes a pressure responsive chamber, connecting means for leading reference pressure into said chamber, a restriction in said connecting means, additional connecting means communicating said chamber with reference pressure and bypassing said restriction and valve means in said additional connecting means for preventing communication therethrough in one position and allowing communication therethrough in the other position.

6. In a pressure control system for an aircraft cabin or compartment including an outflow valve for communicating said cabin air with ambient air,
   control means including means for limiting the rate of pressure change in said cabin for controlling said outflow valve,
   said control means being operable against a reference pressure,
   means for deactivating said rate of pressure change means whereby the rate of pressure change in the cabin does not become limited.

7. In a pressure control system as claimed in claim 6 wherein said deactivating means includes tracking means that permits the outflow valve for establishing the pressure in said cabin independently of said rate of pressure change limiting means, and said tracking means tracking the cabin pressure so that it becomes operable solely when said cabin pressure deviates from said reference pressure by a predetermined value.

References Cited

UNITED STATES PATENTS

| | | | |
|---|---|---|---|
| 2,456,215 | 12/1948 | Price | 98—1.5 |
| 2,513,332 | 7/1950 | Kemper | 98—1.5 |

MEYER PERLIN, *Primary Examiner.*